United States Patent [19]

Vanderlinde

[11] Patent Number: 4,729,467
[45] Date of Patent: Mar. 8, 1988

[54] TRANSPORT ASSEMBLY FOR USE WITH STORAGE CONVEYOR, AND COMBINATION

[75] Inventor: Leendert A. Vanderlinde, Kansas City, Mo.

[73] Assignee: Mid-West Conveyor Company, Inc., Kansas City, Kans.

[21] Appl. No.: 865,107

[22] Filed: May 20, 1986

[51] Int. Cl.⁴ .............................................. B65G 37/00
[52] U.S. Cl. .................................. 198/586; 414/278; 414/283
[58] Field of Search ...................... 198/576, 583, 586; 414/278, 279, 281, 283, 389

[56] References Cited

U.S. PATENT DOCUMENTS

| | | | |
|---|---|---|---|
| 3,254,376 | 6/1966 | Burnett | 22/20 |
| 3,337,069 | 8/1967 | Burger | 214/89 |
| 3,565,267 | 2/1971 | Jerome et al. | 214/16.4 |
| 3,674,159 | 7/1972 | Lemelson | 414/278 |
| 3,708,077 | 1/1973 | Richens et al. | 414/279 |
| 3,709,383 | 1/1973 | Jennings et al. | 414/279 |
| 3,738,506 | 6/1973 | Cornford et al. | 414/279 |
| 3,782,563 | 1/1974 | Brockmeyer et al. | 214/16.4 R |
| 4,349,097 | 9/1982 | Curti | 198/586 |
| 4,383,789 | 5/1983 | Takamatsu | 414/279 |
| 4,478,329 | 10/1984 | Heiz | 198/586 |
| 4,492,504 | 1/1985 | Hainsworth | 414/278 |

FOREIGN PATENT DOCUMENTS

2076360 12/1981 United Kingdom ................ 414/283

Primary Examiner—Stephen J. Novosad
Assistant Examiner—William P. Neuder
Attorney, Agent, or Firm—Litman, McMahon & Brown

[57] ABSTRACT

A transport assembly for use with a storage conveyor is provided. Generally, the transport assembly is for use in a warehousing system including a plurality of storage conveyors each having a surface thereon for storage of objects. The storage conveyors do not, independently, include a drive motor. Rather, the transport assembly is provided with means for engagement with a selected storage conveyor, to drive same. In particular, the transport assembly includes a pivotable arm having a powered drive wheel thereon, capable of selectively engaging a conveyor drive wheel. In the preferred embodiment, the arm comprises a yoke having first and second side members. Preferably, the side members include notches therein facilitating proper alignment and secure engagement between the arm and the storage conveyor. Two transport assemblies are disclosed, one for use with a charging end of a storage conveyor and the other for use with a discharge end. Also, an operational combination of a transport assembly with a storage conveyor is disclosed.

20 Claims, 9 Drawing Figures

TRANSPORT ASSEMBLY FOR USE WITH STORAGE CONVEYOR, AND COMBINATION

BACKGROUND OF THE INVENTION

The instant invention relates to article storage systems and apparatus of the type in which articles or objects are stored upon an elongate storage conveyor, such as a belt conveyor. In particular, the invention relates to a system in which a transport assembly may be used to engage a drive wheel on the storage conveyor, driving the conveyor, and transport an object either from the transport assembly to the conveyor or off of the conveyor and onto the transport assembly.

In a warehousing system according to the invention, a plurality of storage conveyors may be arranged in vertical and horizontal rows. The transport assembly may be used to engage certain selected conveyors to drive same and store or retrieve objects. For the preferred embodiment, each warehouse includes at least two transport assemblies, one for loading objects onto the storage conveyor and one for retrieving objects therefrom.

A very wide variety of conventional warehousing systems is presently available. In some, objects are stored upon a non-powered storage conveyor. For these systems, the storage conveyor may be engaged by a truck or other assembly, when desired, so that the storage conveyor may be driven to move objects therealong and so that objects can be transferred between the storage conveyor and the truck.

In a warehouse in which there are a plurality of storage conveyors, it is often preferred that the storage conveyors not themselves be independently powered. That is, each conveyor does not include a motor associated therewith for transport of objects thereon. The reason for this is, in part, that with a large plurality of storage conveyors there would be a requirement for a large number of motors, and power equipment for the conveyors. Since this equipment would be idle for much of the time, inefficiencies would result. Also, such equipment may take up valuable space needed for storage.

Thus, it may be preferred that warehousing systems, such as that described above, be developed in which the storage conveyors are without independent power means. That is, a portable motor is provided which is in engagement with the storage conveyors when it is desired that they be driven.

While conventional systems in which a portable motor engages its storage conveyor, for driving same, are known, the conventional systems have been less than fully satisfactory. In some systems, a frictional engagement between a portable motor and the storage conveyor is used. However, friction systems have, in the past, met with only limited success. For example, a friction drive may be less efficient than is desirable especially with heavy loads, and engagement between the portable motor and the storage conveyor has been difficult to effect with security.

In at least one other system, such as that described in U.S. Pat. No. 3,565,267 issued to W. Jerome et al., a positive engagement between the drive motor and the conveyor is provided by means of a toothed drive sprocket or gear on the conveyor. While such a system shows improvement with respect to security of engagement, in the past there has not been provided an adequate means for ensuring easy engagement between the drive motor and the conveyor drive gear.

Conventional warehousing systems have generally failed to provide a good operational combination between the loading or unloading truck and the storage conveyor. Generally, for failure to provide an appropriate operational combination, conventional systems have been somewhat inefficient. Further, many of them have been relatively expensive to assemble or maintain.

OBJECTS OF THE INVENTION

Therefore, the objects of the instant invention are: to provide a transport assembly for use in association with a storage conveyor having a drive wheel thereon; to provide such a transport assembly including a powered drive wheel engageable with the storage conveyor drive wheel; to provide such an assembly in which the drive powered wheel is mounted upon a pivotable arm for relatively easy movement into and out of engagement with the conveyor drive wheel; to provide such an assembly in which the pivotable arm is a yoke including notches therein for ready engagement with an axle of the storage conveyor drive wheel; to provide such an assembly in which the yoke notches are shaped to facilitate proper alignment between the assembly powered drive wheel and the storage conveyor drive wheel; to provide such an assembly in which the assembly powered drive wheel is powered by a motor in communication with a driveshaft; to provide such an assembly in which the yoke comprises first and second sidearms pivotable about the driveshaft; to provide such an assembly in which the motor and yoke are mounted upon a laterally mobile platform capable of adjusting positioning of the yoke and powered drive wheel, should jamming between the powered drive wheel and the storage conveyor drive wheel begin to occur; to provide such an assembly in which the motor, driveshaft and yoke are mounted upon a truck for movement among storage conveyors in a warehouse including a plurality of storage conveyors; to provide such an assembly in which the truck includes a transport mechanism alignable with the storage conveyor; to provide such an assembly in which the transport mechanism includes a small powered roller conveyor mounted upon the truck; to provide such an assembly in which the truck powered roller conveyor is powered independently of the storage conveyor; to provide such an assembly in which the transport mechanism is operationally alignable with the storage conveyor, when the storage conveyor is engaged by the arm and assembly drive gear, to transport an object between the storage conveyor and the transport mechanism; to provide such an assembly in which a switch and sensing mechanism is provided for determining when the arm is in an appropriate orientation for proper engagement between the powered drive wheel and the conveyor drive wheel; to provide such an assembly in which the arm is pivotable about a horizontal axis; to provide such an assembly in which the arm is provided with an engaged and disengaged orientation, the conveyor drive wheel being engaged by the assembly powered drive wheel when the arm is in the engaged position and the arm and powered drive wheel being out of possible engagement with the conveyor drive wheel, when the arm is in the disengaged position; to provide an assembly in which the arm is pivotable through a downward arc during movement between the disengaged and engaged positions; to provide an assembly in which the arm is pivotable along an upwardly directed arc when pivoted between the engaged and disengaged positions; to provide an operational combination including a transport assembly and a storage conveyor in which the transport assembly may be used to drive the storage conveyor; to provide such an operational combination wherein engagement between the transport assembly and the storage conveyor is relatively easy to effect; to provide such an operational combination in which objects may be readily transported between the storage conveyor and the transport assembly; to provide such a transport assembly and such an operational combination which are relatively inexpensive to produce; and to provide such a transport assembly and operational combination which are relatively easy to manufacture, simple to use, and which are particularly well adapted for the proposed usages thereof.

Other objects and advantages of this invention will become apparent from the following description taken in conjunction with the accompanying drawings, wherein are set forth, by way of illustration and example, certain embodiments of this invention.

SUMMARY OF THE INVENTION

A transport assembly is provided for use in association with a storage conveyor having a drive wheel mounted thereon. The transport assembly comprises a transport mechanism mounted on means such as a truck for movement among storage conveyors in a warehouse. The storage conveyors are non-powered, but include drive wheels thereon which, when rotated, drive the storage conveyors, i.e. cause objects to move therealong. The transport assembly includes a conveyor drive mechanism engageable with the storage conveyor drive wheel to rotate same. In the preferred embodiment a positive engagement, such as a gear arrangement between the conveyor drive mechanism and the storage conveyor drive wheel, is provided.

Typically, the transport assembly according to the present invention will be used in a warehouse having a plurality of storage conveyors therein. Generally, the storage conveyors are arranged in parallel rows, each row having several storage conveyors vertically displaced relative to one another. For the embodiment described and shown, the storage conveyors are belt conveyors wherein a movable belt has objects stored thereon. Also, for the preferred embodiment, the storage conveyors are unidirectional. That is, they are generally always operated to move objects in the same direction.

With unidirectional storage conveyors, generally at least two transport assemblies will be used in the warehouse. The first assembly would be used at the loading end of the storage conveyors to transport objects onto the conveyors for storage. The second transport assembly would be used at an opposite end of the storage conveyors to remove objects therefrom. In many ways the transport assemblies are similar; however for the preferred applications of the invention, they are not identical and their differences, where important, will be described in detail herein.

As indicated above, each of the transport assemblies generally includes a truck positionable in engagement with a selected storage conveyor. For the preferred embodiment the truck generally moves along a rail positioned adjacent the ends of parallel rows of storage conveyors and extending perpendicularly thereto. By movement along the rail, the truck can be positioned for operational combination of the transport assembly with any selected storage conveyor row.

The transport assembly includes a transport mechanism thereon for association with the storage conveyor and transport of objects. In the preferred embodiment the transport mechanism comprises a portable roller conveyor, mounted upon the transport assembly. The portable roller conveyor is positioned in the transport assembly so that, as the truck moves, the portable roller conveyor can be moved and aligned with an end of any selected storage conveyor. If the portable roller conveyor is mounted upon a transport assembly used for loading objects onto the storage conveyor, it could be positioned at the loading end of the storage conveyor and aligned with the belt or rollers thereof. Preferably, the portable roller conveyor is power driven by independent power means, so that an object on the portable conveyor can easily be discharged onto the storage conveyor. In a similar but opposite manner the transport mechanism on a transport assembly used at a discharge end of the storage conveyor may also use a small portable powered roller conveyor as the transport mechanism.

Herein when operation of a transport assembly in combination with a storage conveyor is described, objects will often refer to as being transported "between" the storage conveyor and the transport assembly. By "between" no specific direction of movement is intended to be indicated. That is, the movement might be from the transport assembly to the storage conveyor, or vice versa. As will be understood from the detailed description for the preferred embodiment, transport assemblies adapted specifically for one duty or the other are provided.

According to the invention each transport assembly is provided with a conveyor drive mechanism. The conveyor drive mechanism is capable of engagement with a drive wheel mounted on an axle in the storage conveyor. Whenever the drive wheel is rotated, the storage conveyor is driven. The drive wheel is selectively rotated by the conveyor drive mechanism.

It is important that the conveyor drive mechanism be capable of relatively easy and secure engagement with a drive wheel on a selected storage conveyor. Further, it is preferred that relatively simple and clear disengagement be possible. In this manner the transport assembly can relatively easily and rapidly be engaged with any one selected storage conveyor in a warehouse including a plurality of conveyors.

In the preferred embodiment, the drive wheel on the storage conveyor is a toothed sprocket to be selectively engaged by a powered drive gear mounted upon the transport assembly conveyor drive mechanism. Engagement between the gear teeth and the sprocket teeth is facilitated by means described below. Although in the preferred embodiment a positive engagement mechanism, i.e. intermeshing gear teeth, is provided, many of the principles of the present invention could be applied to other types of engagement, for example friction.

Preferably the conveyor drive mechanism includes an arm pivotably mounted in the transport assembly to move the powered drive wheel into and out of engagement. In the preferred embodiments the arm is a yoke comprising first and second elongate, generally parallel sidearms pivotably mounted to rotate about a generally horizontal axis. The powered drive gear is rotatably mounted on an axle extending between the two sidearms, generally perpendicularly thereto. As the arm is pivoted, the powered drive gear, if appropriate dimensions are chosen, may be swung into or out of engagement with a selected storage conveyor drive sprocket.

Generally, easy engagement between the transport assembly and the storage conveyor drive gear is initially dependent upon appropriate lateral positioning of the arm relative to the selected storage conveyor drive wheel and also upon a selection of appropriate dimensions for at least the arm and powered drive gear of the conveyor drive mechanism. However, even with these variables optimized, a small amount of tolerance may lead to problems, as for example with gear jamming.

To help eliminate this latter problem, the arm or yoke is provided with notch means therein to receive a guide post, preferably an axle of the storage conveyor drive wheel, during operative combination of the transport assembly with the storage conveyor. The notch means, in the preferred embodiment, is a pair of notches which are generally V-shaped and which include rounded portions at the vertices for nesting of the drive wheel axle therein. The notches may be used to guide the arm into proper engagement with the selected drive wheel.

With engagement of gears in a manner similar to that described above, there is a the possibility that the gears may be rotated, prior to engagement, into just the appropriate orientations relative to one another to permit jamming. That is, instead of the gear teeth intermeshing, they might align with one another preventing appropriate cooperation between the powered drive gear and the storage conveyor drive wheel. To aid in overcoming this problem, the conveyor drive mechanism of the present invention may be mounted upon a spring-loaded platform that can yield somewhat when jamming begins to occur to permit the gear teeth to properly intermesh.

Generally, in the preferred application a hydraulic system will be used to actuate movement of the arm. It may be preferred that the transport assembly include a switch and sensing mechanism to signal the hydraulic system when the arm has been moved into a proper orientation for engagement between the transport assembly and the storage conveyor. For the preferred embodiment described and shown, the switch and sensor mechanism includes a trip switch in engagement with the arm.

As suggested above, the drive gear of the conveyor drive mechanism is powered. Preferably, the power is provided by a motor and gear box mounted upon the transport assembly so that it is mobile therewith. In the preferred embodiment, the motor and gear box are mounted upon the spring-loaded platform referred to above, and they cooperate to drive a drive axle.

The drive axle preferably passes through the arm in a direction generally perpendicular thereto for the preferred embodiment. This means the drive axle is perpendicular to the yoke sidearms. The arm axis-of-rotation is preferably coaxial with the axis of the drive axle. A toothed gear is mounted upon the drive axle at the point where the drive axle passes between the sidewalls, the toothed gear being in engagement with the conveyor drive mechanism powered drive gear to power same. Thus, when the transport assembly is in operational combination with a storage conveyor, the storage conveyor is driven by means of a three gear drive train comprising the toothed gear mounted upon the drive axle, the powered drive gear mounted in the arm, and the drive wheel mounted upon the storage conveyor.

As previously indicated, in the preferred embodiment the storage conveyors are unidirectional. That is, they are always operated to drive objects in the same direction. When used in a system according to the present invention, such storage conveyors will usually have a drive wheel located at each end, i.e. one at the charging end and one at the discharge end. Generally, each needs to be engaged by a conveyor drive mechanism at some point during operation of the warehouse.

Initially, the drive wheel at the charging end will usually be engaged by a conveyor drive mechanism mounted upon a transport assembly used for loading. When an object is to be removed from the storage conveyor, the drive wheel at the discharge end will usually be engaged by a conveyor drive mechanism located on an unloading transport assembly.

As will be seen from the detailed descriptions, it is envisioned that for certain storage conveyors the charging end drive wheel and discharging end drive wheel would preferably be engaged by an appropriate conveyor drive mechanism in similar, but opposite, manners. Specifically, at the charge end it is envisioned that the arm, in moving between the disengaged position and the engaged position, would move through a downwardly directed arc. On the other hand, at the discharging end of the conveyor it is envisioned that the arm, in moving from the disengaged position to the engaged position, would swing through an upwardly directed arc about the pivoting axis. Thus, the conveyor drive mechanism for a transport assembly used at the loading end of a storage conveyor, in the preferred embodiment, is in many ways analogous to a conveyor drive mechanism mounted upon a transport assembly used at an unloading end of the storage conveyor; however, the arm of each is generally oppositely mounted to swing through an opposite arc. This permits rotational action of the powered drive gear to operate to help retain the arm in position at both the charging end and the discharging end.

As suggested above, in some warehouses it may be desired to have a plurality of storage conveyors vertically disposed, relative to one another, in a rack or frame system. Thus, preferably, the means for orienting the transport assembly and transport mechanism relative to the storage conveyors includes vertical lift means capable of lifting the transport mechanism and conveyor drive mechanism vertically to engage storage conveyors at different vertical levels. In many instances it may be desired to have a warehouse include rows of racks, each having several vertically displaced storage conveyors located therein.

The drawings constitute a part of this specification and include exemplary embodiments of the present invention and illustrate various objects and features thereof. It is noted that in some instances material thicknesses may be shown exaggerated, for clarity.

DETAIL DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but rather merely as a basis for the claims and as a representative basis for teaching one skilled in the art to variously employ the present invention in virtually any appropriately detailed structure.

Figure 1:
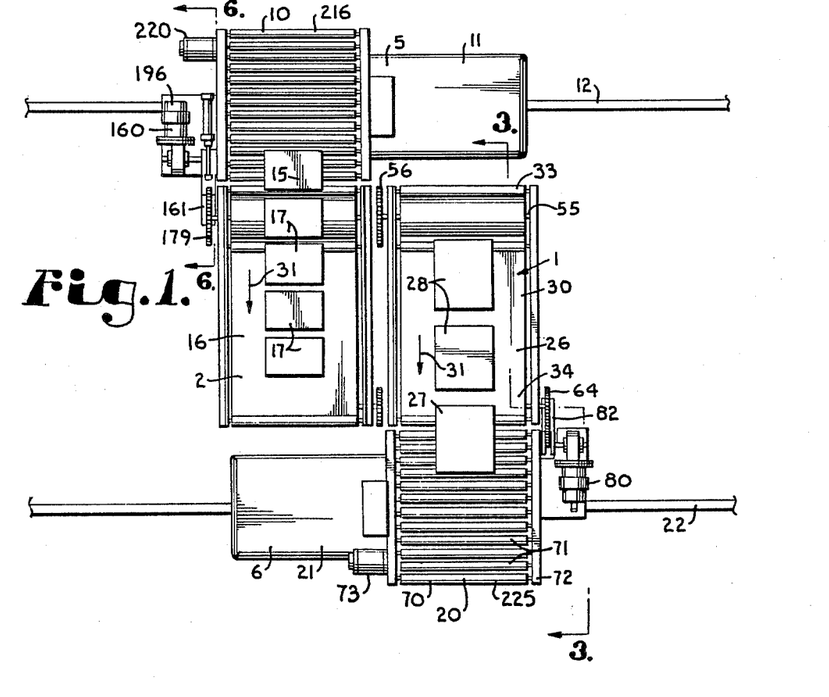
FIG. 1 is a fragmentary top plan view of two transport assemblies according to the present invention shown in operative combination with a pair of storage conveyors.

FIG. 1 is a top plan view of a portion of a warehouse including apparatus according to the present invention. In FIG. 1 the reference numeral 1 indicates a first storage conveyor, and reference numeral 2 a second, parallel, storage conveyor. The reference numeral 5 generally designates a transport assembly positioned in operative combination with a charging end of storage conveyor 2. The reference numeral 6 generally designates a transport assembly in operative combination with a discharge end of storage conveyor 1. As will be understood from the following descriptions, transport assemblies 5 and 6, for the preferred embodiment, are not completely identical to one another. However, they are substantially similar and include many analogous parts.

Referring again to FIG. 1, transport assembly 5 includes a transport mechanism 10 mounted upon motive means such as truck 11. The truck 11 is provided with means, not shown, to ride along guide rail 12 for engagement with any of a plurality of parallel aligned conveyors, such as storage conveyors 1 and 2.

Transport assembly 5 is used to transport an object or article onto a storage conveyor for storage. For example, in FIG. 1 transport assembly 5 is shown about to transfer box 15 onto an upper storage surface 16 of storage conveyor 2. It is noted that storage conveyor 2 is depicted with a plurality of boxes 17 already stored thereon.

Transport assembly 6, analogously, includes a transport mechanism 20 which rides upon truck 21 along guide rail 22. Again, in FIG. 1, transport assembly 6 is shown with transport mechanism 20 aligned for receipt of articles being discharged from an upper surface 26 of storage conveyor 1. In particular, transport assembly 6 is shown receiving box 27 from the storage conveyor 1. It is noted that storage conveyor 1 is depicted with a plurality of boxes 28 stored thereon.

The storage conveyors 1 and 2, depicted in FIG. 1, are generally identical to one another and aligned parallel with respect to one another. The storage conveyors of FIG. 1 are of a belt type, that is, referring to storage conveyor 1, they each include a continuous belt 30 movable by conventional means, not detailed, to convey articles thereon from one end to another. The storage conveyors 1 and 2 of FIG. 1 are generally of a unidirectional type. That is, their belts are generally always operated in the same direction, the upper surfaces moving generally in a direction of arrows 31. Thus storage conveyor 1, for example, includes a charging end 33 at which articles are usually transported onto the storage conveyor 1 and a discharge end 34 from which articles are usually discharged from the conveyor 1.

Figure 2:
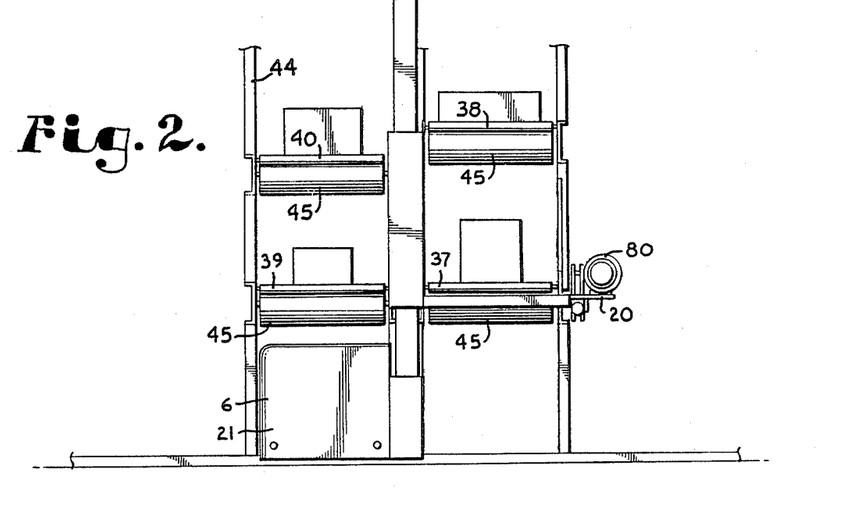
FIG. 2 is a front elevational view of an operational combination of a transport assembly according to the present invention in association with rows of vertically spaced storage conveyors.

FIG. 2 is an end elevational view generally analogous to FIG. 1. In FIG. 2, however, four generally parallel storage conveyors are shown. In particular storage conveyors 37 and 38 are shown vertically disposed relative to one another, and storage conveyors 39 and 40 are shown vertically disposed with respect to one another and also positioned laterally spaced from conveyors 37 and 38. From FIG. 2 it can be understood that a warehouse may include a rack or frame system 44 which has a plurality of storage conveyors 45 therein. The storage conveyors 45 may be aligned in parallel rows with some rows including a plurality of storage conveyors disposed vertically with respect to one another. By reference again to FIG. 1, it will be understood that a transport assembly riding along a guide rail positioned "in front" of such a rack or "behind" such a rack would be capable of accessing any selected storage conveyor if the transport assembly were appropriately adapted.

A warehousing system such as that shown in FIG. 2 may be particularly desirable under certain circumstances since very long storage conveyors might be stacked in very close arrangement with respect to one another. Generally, the first object stored on any given conveyor would be the first object removed because the conveyors are preferably unidirectional. As a result, with only minimal access points being provided, an efficient warehousing system is created.

For such a warehousing system it will be preferred that the storage conveyors be "dead", that is, that they not each have an individual motor or powered drive system directly associated therewith. Rather, preferably each transport assembly would have means thereon capable of engaging a selected storage conveyor and driving same to move the belt and thus articles stored thereon.

Numerous advantages are obtained from such an arrangement. For example, it is noted that much of the time most of the storage conveyors of any given warehouse will probably remain static. That is, their belts would be stationary, and objects would not be moved thereon or there along. Thus, if they were each to be provided with motors, a plurality of motors would be needed and inefficiencies could result from the fact that at any given time most of the motors would not be operating or even be needed for operation. Further, the motors and equipment associated with the conveyors to provide a powered drive mechanism would take up considerable space and potentially lead to inefficiencies in use of warehousing space. Further, the storage conveyors would be heavier, would be more expensive to manufacture and assemble, would likely require more maintenance, and would be less desirable for their proposed usage.

Therefore, according to the present invention each transport assembly is provided with a conveyor drive mechanism capable of engagement with a selected storage conveyor to power same when desired. In this manner a great plurality of motors are avoided; rather a selected motor and related apparatus are brought to a selected storage conveyor.

Before a more detailed description of transport assemblies 5 and 6 is provided, a more detailed examination of one of the storage conveyors is presented.

Figure 3:
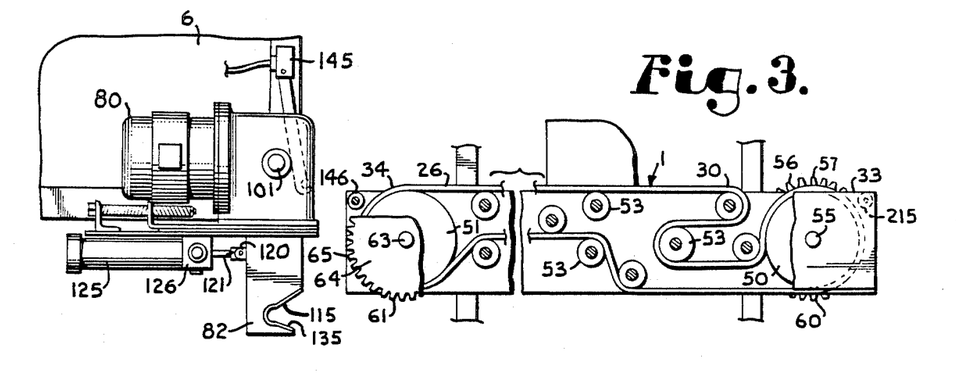
FIG. 3 is an enlarged fragmentary side cross-sectional view taken generally along line 3—3 of FIG. 1 and showing a transport assembly positioned with a conveyor drive mechanism thereon disengaged relative to a storage conveyor and with portions broken away to show internal detail.

By reference to FIG. 3, storage conveyor 1 may be examined in some detail. Storage conveyor 1 includes a continuous belt 30 mounted upon end rollers 50 and 51 and supported by guide and idler rollers 53. It will be understood that many more rollers 53 may be used than are depicted, and in FIG. 3 only sufficient rollers 53 are shown to indicate general operation.

As previously indicated, storage conveyor 1 is unidirectional, with the upper surface 26 of belt 30 generally only being moved in the direction of arrow 31 during operation. In FIG. 3, this motion would be from right to left, i.e. from the charging end 33 to the discharge end 34.

Rotation of either one of the end rollers 50 or 51 may be used to actuate storage conveyor 1 and move the belt 30. For example if end roller 50, FIG. 3, were rotated in a counter-clockwise manner, as viewed, belt 1 would be driven in the direction of arrow 31, FIG. 1. Referring to FIG. 1, end roller 50 is mounted upon axle 55. Axle 55 has a drive wheel 56 associated therewith. In the preferred embodiment, drive wheel 56 is a toothed sprocket 57. Generally, the toothed sprocket 57, axle 55 and end roller 50 comprise a drive mechanism 60 for storage conveyor 1, FIG. 3. In particular, drive mechanism 60 is positioned at the charging end 33 of storage conveyor 1 and is engageable by transport assembly 5, by means detailed below, for loading objects onto the storage conveyor 1.

A second drive mechanism 61 is positioned at the discharging end 34 of the storage conveyor 1. Drive mechanism 61 includes end roller 51 mounted upon an axle 63, the axle 63 having a drive wheel 64 associated therewith.

In the preferred embodiment, drive wheel 64 comprises a toothed sprocket 65, FIGS. 1 and 3. Referring to FIG. 1, drive mechanism 61 is oriented for possible engagement by transport assembly 6, which is capable of alignment with discharging ends of the storage conveyors.

It is noteworthy that toothed sprockets 57 and 65, FIG. 1, are located on opposite sides of storage conveyor 1. Referring to FIG. 3, toothed sprocket 65 should be rotated counter-clockwise, when viewed from the perspective of FIG. 3, in order to drive conveyor belt 30 in the desired direction. Toothed sprocket 57, on the other hand, is mounted on an opposite side of the conveyor 1. When facing toothed sprocket 57 from the perspective of the opposite side of conveyor 1, the sprocket 57 should be rotated clockwise and would be approached by a transport assembly from an opposite direction. This difference generates a difference in the drive mechanisms 60 and 61 at the charging and discharging ends 33 and 34 respectively for the preferred embodiment. The differences in drive mechanisms 60 and 61, where important, will be detailed.

Referring to FIG. 3, initially transport assembly 6, used at the discharging end 34 of the storage conveyors, will be examined in detail. As indicated above, transport assembly 6 includes a transport mechanism 20, FIG. 1, mounted upon truck 21. Truck 21 includes means for positioning the transport mechanism 20, relative to a selected storage conveyor 45, FIGS. 1 and 2, by horizontal motion along guide rail 22 and also by including means for vertical lift. Referring to FIG. 1, transport mechanism 20 of assembly 6 comprises a small powered roller conveyor 70 mounted upon truck 21. The conveyor 70 includes a plurality of spaced, parallel rollers 71 mounted in frame 72. The rollers 71 are powered by a motor 73 to rotate in a manner appropriate to move objects onto the conveyor 70 or discharge objects therefrom, as desired. It will be understood by those skilled in the art that a variety of designs of transport mechanisms 20 may be used, as for example any of a plurality of conventional powered roller arrangements. Preferably, the motor 73, which drives powered roller conveyor 70, is independent from the means for powering the storage conveyor 1. In this manner, the power roller conveyor 70 may be operated when storage conveyor 1 is engaged by transport assembly 6, but when it is desired not to actually move belt 30.

Again, by reference to FIG. 1 it will be understood that to a great extent the purpose of the truck 21 is to maneuver the transport mechanism 20 into position for receipt of objects from a selected storage conveyor at the discharging end. Thus, again, the truck 21 is provided with horizontal movement means to select a row of conveyors and also vertical movement means to position the transport mechanism 20 appropriately with respect to a selected storage conveyor in a vertical column of storage conveyors.

Figure 4:
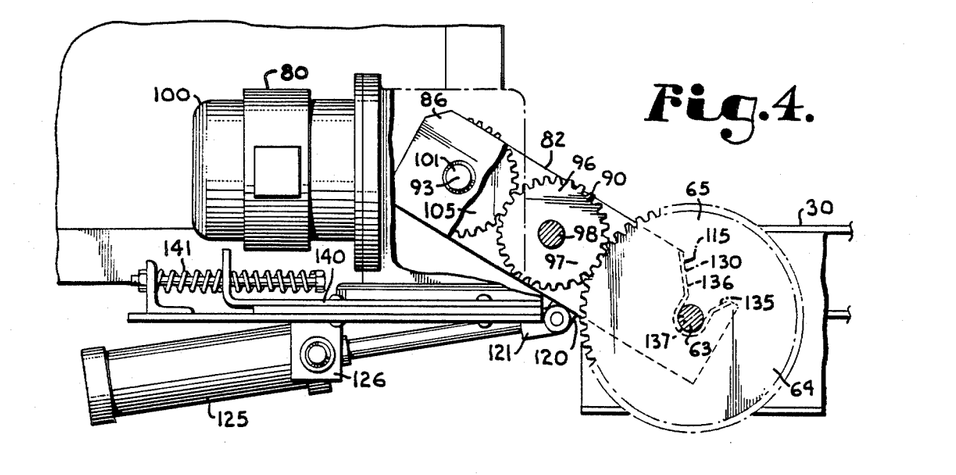
FIG. 4 is a further enlarged fragmentary side elevational view of a portion of the transport assembly according to the present invention taken generally from the viewpoint of FIG. 3 and showing a portion of the conveyor drive mechanism engaging a portion of the storage conveyor, with portions broken away to show internal detail.

Referring to FIGS. 3 and 4, assembly 6 is provided with a conveyor drive mechanism 80 appropriate for engagement with a conveyor drive wheel 64 at a discharging end 34 of a storage conveyor 1. By means of this engagement, the conveyor drive mechanism 80 can rotate a selected drive wheel 64 to power storage conveyor 1, moving its belt 30.

A principal component of drive mechanism 80 is a movable arm 82. The arm 82 is pivotably mounted in the mechanism 80 and is movable between two extreme positions represented by FIGS. 3 and 4.

In FIG. 3, a disengaged position is shown wherein the arm 82 is moved out of engagement with the storage conveyor 1. When the arm 82 is in this orientation the transport assembly 6 can be moved along the track 22 to other storage conveyors.

In FIG. 4, on the other hand, arm 82 is shown in an engaged position with respect to drive wheel 64 on the storage conveyor 1. When in this position, the arm 82 provides engagement between conveyor drive mechanism 80 and the storage conveyor 1 to power same.

Referring again to FIGS. 4 and 5, the arm 82 of the conveyor drive mechanism 80 depicted is preferably a yoke 86 comprising first and second elongate sidearms 87 and 88. The sidearms 87 and 88 are substantially mirror images of one another, and are mounted to extend generally parallel with respect to one another. The sidearms 87 and 88 are spaced apart sufficiently for receipt of a drive train 90, FIG. 4, therebetween.

In the preferred embodiment the arm 82 is mounted for rotation about pivot point 93, FIG. 4. An example of the pivoting is shown by comparison of FIGS. 3 and 4. This pivoting permits the arm 82 to be moved between the disengaged position, FIG. 3, and the engaged position, FIG. 4.

The conveyor drive mechanism 80 includes a powered drive wheel 96 mounted therein in an orientation enabling selected engagement with the drive wheel 64 on the storage conveyor 1, FIG. 4. In the preferred embodiment the powered drive wheel comprises a drive gear 97 notched or toothed for positive engagement with tooth sprocket 65. The drive wheel 96 is preferably rotatably mounted upon an axle 98 which extends between the sidearms 87 and 88 of the yoke 86 and is directed generally perpendicular thereto. The powered drive gear 97 is, in the preferred embodiment, an idler gear driven by means of a motor and gear box system 100, FIG. 5. Also, by generally conventional means, the motor and gear box power drive axle 101.

Figure 5:
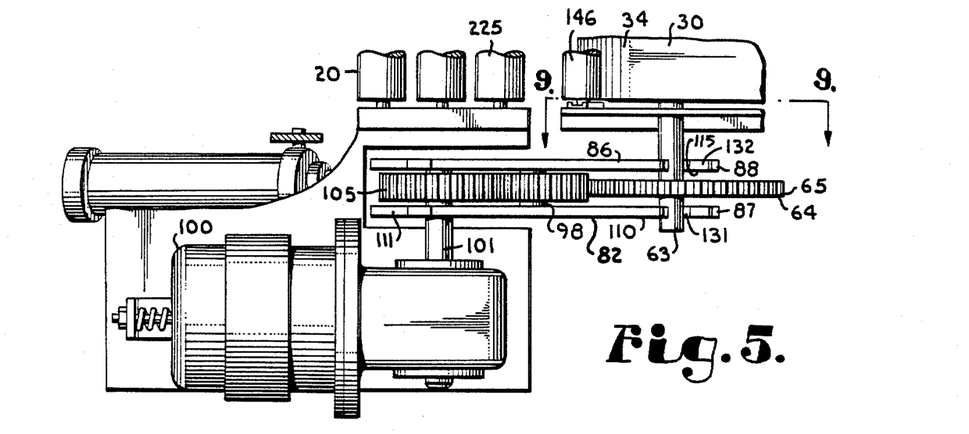
FIG. 5 is an enlarged fragmentary top plan view showing a portion of an operative combination between the transport assembly and the storage conveyor depicted in FIG. 4, with portions broken away to show detail.

Referring to FIGS. 4 and 5, in the preferred embodiment the yoke 86 is pivotably mounted about a rotation axis 93 defined by a longitudinal axis of the drive axle 101. This can be accomplished by means of bearings and conventional mechanisms not detailed.

At the point where drive axle 101 passes through the yoke 86, and between sidearms 87 and 88, the axle 101 includes a gear 105 mounted thereon. Gear 105 engages the powered drive wheel 96 and provides for a drive train between the motor and gear box assembly 100 and the powered drive wheel 96. Thus, as the drive axle 101 is rotated, the drive gear 97 is also rotated.

Referring to FIG. 5, the sidearms 87 and 88 define an arm 82 or yoke 86 having a first end portion 110 and a second end portion 111. The first end portion 110 of the preferred yoke 86 defines a receiving space 115 into which at least a portion of the conveyor drive wheel 64 is received during engagement between the transport assembly 6 and the storage conveyor 1. As is shown in FIG. 4, receipt of a portion of the conveyor drive wheel 65 into the receiving space 115 facilitates engagement between the powered drive wheel 96 and the conveyor drive wheel 64 so that the motor and gear box 100 can be used to power storage conveyor 1.

Referring to FIGS. 3 and 4, an actuating mechanism for pivoting the arm S2 between engaged and disengaged positions is shown. The arm 82 includes an extension 120 thereon. The extension 120 is pivotally engaged by an end portion 121 of piston and cylinder arrangement 125. The piston and cylinder arrangement is itself pivotally mounted in a conventional mount 126. The piston and cylinder arrangement 125 may be operated by conventional means, not shown, to actuate the arm 82 between the two positions represented by FIGS. 3 and 4. Generally, a variety of actuating means for pivoting of the arm 82 may be used however, the mechanism shown is particularly convenient for smooth operation with efficient use of space.

To facilitate engagement between the arm 82 and the drive wheel 64 on the storage conveyor 1, the arm 82 of the preferred embodiment is provided with means comprising a receiving notch 130, FIG. 4. Generally, each sidearm 87 and 88 is provided with a notch, 131 and 132 respectively, which cooperate to form notch 130. Referring to FIG. 5, notches 131 and 132 are disposed with respect to one another so that they are oppositely positioned in the yoke 86.

Referring to FIGS. 4 and 5, the conveyor drive wheel 64 is mounted upon axle 63. During engagement between the arm 82 and the storage conveyor 1, axle 63 is received within the notch 130. Generally, the positioning of the notch 130 is selected so that when the axle 63 is received therein appropriate spacing with respect to the conveyor drive wheel 64 and the powered drive wheel 96 is maintained. It is noted that while in the preferred embodiment the notch 130 is shown positioned for engagement with the axle 63, the notch could be oriented for engagement with some other guide post associated with the storage conveyor. That is, generally the axle 63 is a type of guide post for engagement by the arm 82.

Referring to FIG. 4, ease of engagement between the notch 130 and the axle 63 is facilitated by a preferred shape for the notch 130. The preferred notch 130 includes a front recessing edge 135, a rear recessing edge 136, and a central rounded vertex portion 137. Preferably, the vertex portion 137 is sized for seating of the axle 63 therein. As the arm 82 is pivoted toward the engaged position, should there be some slight misalignment with respect to the axle 63, the axle 63 will be abutted by either the front edge 135 or rear edge 136 of the notch 130. The axle 63 would then be guided by the engaged edge 135 or 136 into the appropriate recess 137. Means, described below, permit some adjustment in the position of the arm 82 and the remainder of the conveyor drive mechanism 80 during engagement.

In particular, in the preferred embodiment, FIG. 4, the conveyor drive mechanism 80 is mounted upon a platform 140 which is capable of some limited lateral sliding movement. Biasing means 141 generally ensures that the platform 140 is maintained in a preferred location. Generally, as the arm 82 is swung into the engaged position, if perfect alignment between the notch 130 and the axle 63 is lacking, the biasing means 141 will permit the platform 140 to slide somewhat, adjusting the orientation of the arm 82 until engagement is achieved. Further, the platform 140 and biasing means 141 can yield somewhat should the drive gear 97 and toothed sprocket 65 begin to jam during engagement. That is, if the teeth do not immediately intermesh the conveyor drive mechanism 80 can move slightly until intermeshing of gears is achieved.

Generally it will be preferred that the assembly 6 include a switch and sensor means for detecting generally when the arm 82 has been positioned appropriately for engagement, FIG. 4. Referring to FIG. 3, a switch and sensor mechanism 145 is shown. The mechanism 145 generally comprises a trip switch which follows motion of the pivoting arm 82. When the arm 82 is extended in a position or at an angle which is proper for engagement, the trip switch will sense the achievement of that position and signal the assembly to stop extending the piston and cylinder arrangement 125. This, generally, helps avoid undesired stresses being placed upon the transport assembly 6 or the storage conveyor 1 during engagement, FIG. 4.

Figures 7, 9:
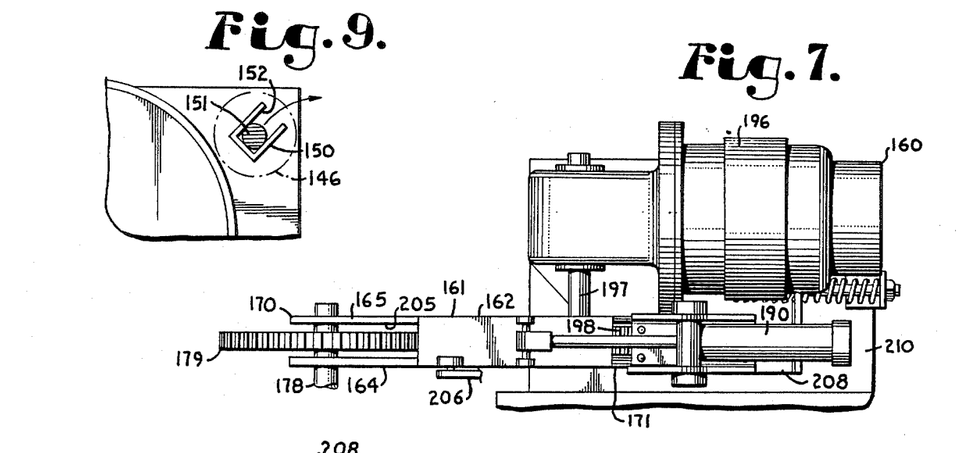
FIG. 7 is an enlarged fragmentary top plan view of the operative combination shown in FIG. 6.
FIG. 9 is an enlarged fragmentary cross-sectional view taken generally along line 9—9 of FIG. 5.

Referring to FIG. 9, in the preferred embodiment the storage conveyor 1 has on its discharge end a removable end roller 146. The end roller 146 generally helps guide articles riding upon the storage conveyor 1 into the transport assembly 6. Preferably, the end roller 146 is slidably mounted in a safety mount 150 so that should something become caught between the end roller 146 and the conveyor belt 30, the roller 146 would simply pop out. This system is particularly advantageous for protection of workers' hands. The mount is provided by simply having the axle 151, FIG. 9, of the roller 146 mounted in a slot 152 which is appropriately oriented. It will be understood that the end roller 146 would have each of its ends mounted in similar slots oriented as mirror images of one another.

Referring to FIGS. 3 and 4, the transport assembly 6 operating at the discharge end 34 of a storage conveyor 1, for engaging the arm 82 with the conveyor drive wheel 64, swings the arm 82 through an upwardly directed arc, at least for the preferred embodiment. Referring to FIG. 4, this results in a mechanical advantage derived from the gear train 90. It is noted that during operation of the conveyor drive mechanism 80, FIG. 4, drive wheel 64 would be rotated counter-clockwise. Thus, powered drive wheel 96 would be operated clockwise. As powered drive wheel 96 is operated clockwise it will tend to work with the piston and cylinder assembly 125 in pushing the arm 82 against the axle 63. Thus, the piston and cylinder assembly 125 need not be solely relied upon for maintaining the arm 82 in position.

Figure 6:
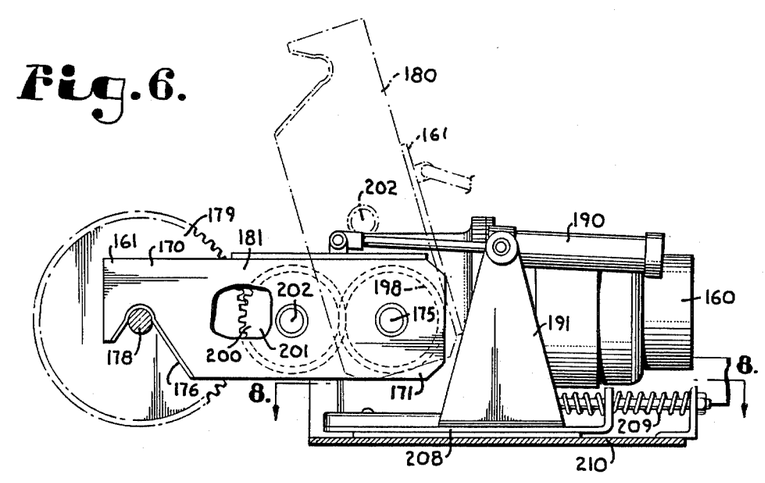
FIG. 6 is an enlarged fragmentary side cross-sectional view taken generally along line 6—6 of FIG. 1 and depicting an operative engagement between a transport assembly and a charging end of a storage conveyor, the phantom lines indicating alternate positioning of a portion of the transport assembly and portions being broken away to show internal detail.

FIGS. 6 and 7 depict a portion of transport assembly 5, which is shown in FIG. 1 loading objects onto a charging end of storage conveyor 2. In many ways the transport assembly 5 is either identical with, or analogous to, transport assembly 6 previously described. However a major difference is that an assembly such as transport assembly 5, when it engages a drive wheel at the charging end of a storage conveyor, for the preferred embodiment, rotates the drive wheel in an opposite direction, relative to the assembly, than a drive wheel engaged by a transport assembly 6 at the discharging end. To facilitate this, in moving from the disengaged position to the engaged position, an arm on the transport assembly 5 at the charging end swings through a downward arc, that is, through an oppositely directed arc to that for assembly 6 at the discharge end. This will be understood by reference to FIGS. 6 and 7 and results in leverage generated by the drive train of assembly 5 helping to maintain the arm against the axle.

Generally, as shown in FIG. 6, transport assembly 5 includes a conveyor drive mechanism 160. The conveyor drive mechanism 160 includes a pivotable arm 161 mounted therein. As for transport assembly 6, arm 161 is preferably a yoke 162 having first and second elongate sidearms 164 and 165, FIG. 7. The arm 161 includes a first end portion 170 and a second end portion 171, FIG. 6. The second end portion 171 is pivotably mounted in the assembly 5 about pivot point or axle 175. The first end portion 170 includes a notch 176 therein for engagement with an axle 178 for a conveyor drive wheel 179, in a manner analogous to that previously described for transport assembly 6.

Referring to FIG. 6, the arm 161 is pivotable between a disengaged position 180, shown in phantom lines, and an engaged position 181. The pivoting is actuated by means of a mechanism such as cylinder and piston assembly 190. The assembly is pivotally mounted on bracket 191 to permit pivoting of the assembly 190 as the arm 161 is raised and lowered. The cylinder and piston assembly 190 may be generally of conventional construction and operated by conventional actuation means, not detailed.

Analogously to transport assembly 6, the conveyor drive mechanism 160 of transport assembly 5 is powered by motor and gear box assembly 196 which rotates drive axle 197 to rotate gear 198. The gear 198 is used to drive powered drive wheel 200 comprising a toothed gear 201, which is rotatably mounted in the arm 161 on axle 202, FIG. 6.

As with transport assembly 6, the arm 161 of transport assembly 5, FIG. 7, includes a receiving space 205 therein for receipt of at least a portion of the conveyor drive wheel 179 therein during engagement.

Figure 8:
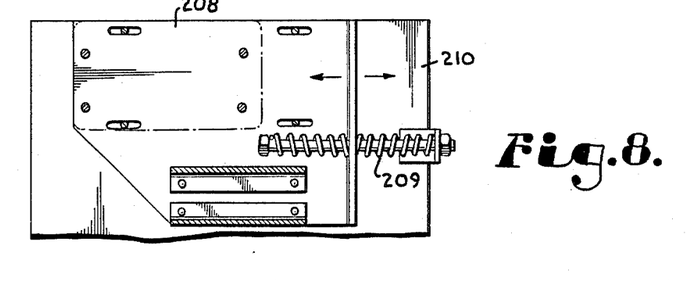
FIG. 8 is an enlarged fragmentary top cross-sectional view taken generally along line 8—8 of FIG. 6.

In most manners, as indicated above, conveyor drive mechanism 160 is analogous to conveyor drive mechanism 80. It includes a switch and sensor mechanism 206, FIG. 7, not detailed, to facilitate engagement. The notch 176, in the preferred embodimont, is generally analogous to notch 130, only oppositely oriented for engagement by a downwardly projecting arc rather than an upwardly projecting one. The conveyor drive mechanism 160 is mounted upon a slideable platform 208 with biasing means 209 permitting adjusting as previously described. Platform 208 and biasing means 209 are shown detailed somewhat in FIG. 8. Generally, the platform 208 is slideable upon a base portion 210. Again, the biasing means 209 helps maintain a selected orientation.

Referring to FIG. 3, the charging end 33 of the conveyor 1 may be provided with an end roller 215. The end roller 215 may also be mounted in a safety slot for easy dismounting, should jamming occur, analogously to end roller 146. Also, transport assembly 5, FIG. 1, includes a generally analogous transport mechanism 216.

General operation of a warehousing system utilizing transport assemblies and storage conveyors according to the present invention is understood by reference to FIGS. 1 and 2. Referring to FIG. 1, it is assumed that an object 15 is positioned on a transport assembly 5 operating on a track 12 at the charging end of a row of storage conveyors 1 and 2. The transport assembly 5 would be moved by the truck 11 along track 12 until appropriate alignment between the transport mechanism 216 and the charging end of a selected storage conveyor 2 is obtained. Referring to FIG. 2, this may require some vertical movement of transport mechanism 216.

Preferably, the conveyor drive mechanism 160 is selectively oriented for engagement with drive wheel 179 on conveyor 2 when the transport mechanism 216 is appropriately aligned with conveyor 2. Thus, the arm 161 can be pivoted into an engaged position. At this point, motor 220, powering transport mechanism 216, may be used to transport the box 15 toward conveyor 2. Also, motor and gear box 196 may be used to power conveyor 2 to move boxes 17 therealong in the direction of arrows 31, making conveyor 2 able to receive box 15 transported thereto from transport mechanism 216. When transport is complete, motors 220 and 196 may be stopped and arm 161 disengaged. At this point, transport assembly 5 is prepared for travel along track 12 to a different location for either further transfer of boxes therefrom, or to receive a box from some selected loading/unloading apparatus.

Transport assembly 6 is shown at the discharging end of the row of storage conveyors 1 and 2, moving therealong by means of truck 21 on track 22. When unloading from conveyor 1, for example, is intended, truck 21 is used to position the transport mechanism 225 of transport assembly 6 appropriately. Again, this results in proper alignment between conveyor drive mechanism 80 and the storage conveyor drive sprocket 65. The conveyor drive mechanism 80 may then be used to engage the arm 82 with drive sprocket 65, and power the storage conveyor 1. An article such as article 27 may then be transported onto the transport mechanism 225 by selected, and if desired independent, operation of motor 73 and motor 100. For some storage conveyors vertical movement of the transport mechanism 225 may be necessary, FIG. 2, for proper alignment.

It is noted that while the present invention has been described in use with a storage conveyor of the belt type, different types of storage conveyors may be used. For example, the storage conveyors could be roller conveyors powered by a main drive wheel located at an end thereof and engageable by the transport mechanisms.

It is also to be understood that while embodiments of the present invention have been illustrated and described, it is not to be limited to the specific forms or arrangement of parts herein described and shown, except as limited by the following claims.

What is claimed and desired to be secured by Letters Patent is as follows:

1. A transport assembly for use in association with a storage conveyor having a drive wheel thereon; said transport assembly comprising:
   (a) a transport mechanism for carrying an object;
   (b) means for orienting said transport assembly with said transport mechanism at selected locations for loading and unloading;
   (c) a conveyor drive mechanism including a pivotably mounted arm with a powered wheel mounted thereon;
   (d) actuating means for selectively rotating said powered wheel; and
   (e) an arm actuator for selectively positioning said arm in an engaged position and a disengaged position;
      (i) said engaged position having said arm extending outwardly for engagement with a portion of the storage conveyor drive wheel and to operably engage said powered wheel with the conveyor drive wheel for selected rotation of the conveyor drive wheel, to operate the conveyor, as said powered wheel is actuated; and
      (ii) said disengaged position having said arm and said powered wheel positioned out of possible engagement with the conveyor drive wheel;
   (f) whereby said transport mechanism may be selectively oriented in an operative position relative to a storage conveyor; and
   (g) whereby said conveyor drive mechanism may be selectively operated to engage said powered wheel with the conveyor drive wheel so that selective actuation of said powered wheel drives the storage conveyor, facilitating transfer of an object between the storage conveyor and the transport mechanism.

2. An transport assembly for use in association with a storage conveyor having a drive sprocket mounted thereon, on a drive sprocket axle; said transport assembly comprising:
   (a) a transport mechanism for carrying an object;
   (b) truck means for orienting said transport assembly with said transport mechanism at selected locations for loading and unloading;
   (c) a conveyor drive mechanism including a pivotably mounted arm and a powered drive gear;
      (i) said arm comprising a yoke including first and second laterally spaced elongate sidearms;
      (ii) said yoke having a first end portion and a second end portion;
      (iii) said powered drive gear being mounted between said sidearms and being rotatable about an axis-of-rotation extending generally perpendicular to said yoke sidearms and positioned generally between said yoke first and second end portions;
      (iv) said yoke first end position having a receiving space therein for receipt of at least a portion of the conveyor drive sprocket therein during operation of said transport assembly; and
      (v) said powered drive gear being selectively engageable with the conveyor drive sprocket;
   (d) motive means mounted on said truck means; said motive means including a motor and drive shaft;
      (i) said drive shaft extending through said yoke second end portion in a direction generally perpendicular to said sidearms;
      (ii) said motor being selectively operable to rotate said drive shaft; said drive shaft having means thereon providing selected rotation of said powered drive gear when said motor is selectively actuated; and
      (iii) said yoke being mounted for pivoting about a pivot axle defined by a longitudinal axis of said drive shaft; and
   (e) a yoke positioning mechanism for selectively pivoting said yoke about said pivot axle between engaged and disengaged positions;
      (i) said engaged position having said yoke extending generally outwardly for receipt of a portion of the conveyor drive sprocket in said receiving space to operably engage said powered drive gear with the conveyor drive sprocket enabling selected rotation of the conveyor drive sprocket, to drive the conveyor, upon selected actuation of said motor; and
      (ii) said disengaged position having said yoke and said drive gear positioned out of possible engagement with the conveyor drive sprocket;
   (f) whereby said transport mechanism may be selectively oriented in an operative position relative to a storage conveyor having a drive sprocket thereon; and
   (g) whereby said conveyor drive mechanism may be selectively operated to engage said powered drive gear with the conveyor drive sprocket so that selected actuation of said drive gear drives the storage conveyor, facilitating transfer of an object between the storage conveyor and the transport mechanism.

3. An assembly according to claim 2 wherein:
   (a) said first sidearm has a first drive sprocket axle-receiving notch therein; and,
   (b) said second sidearm has a second drive sprocket axle-receiving notch therein;
      (i) said first and second notches being aligned to cooperatively engage the drive sprocket axle when said yoke is in said engaged position; and
      (ii) said notches being spaced, relative to said powered drive gear, to ensure operative engagement between said powered drive gear and a drive sprocket mounted on the drive sprocket axle engaged by said notches;
   (c) whereby said notches provide a guide for operatively positioning said yoke relative to the conveyor drive sprocket.

4. An assembly according to claim 3 wherein:
(a) each of said notches includes a forward slanting edge and a rearward slanting edge; said forward slanting edge and said rearward slanting edge terminating in a rounded vertex portion;
  (i) said notch vertex portions being positioned for operative engagement between said yoke and the conveyor drive sprocket axle;
(b) whereby the notch forward and rearward slanting edges may be used to guide the yoke into engagement with the conveyor drive sprocket axle.

5. An assembly according to claim 4 wherein:
(a) said yoke positioning mechanism and said motive means have a biasing means asociated therewith to permit said yoke to longitudinally move relative to the drive sprocket when said yoke moves into said engaged position with said powered drive gear encountering the drive sprocket in a jamming fashion;
(b) whereby force built up during a jamming of said drive gear with the conveyor drive sprocket may be relieved during said jamming, facilitating an operative engagement between said drive gear and said conveyor drive sprocket.

6. An assembly according to claim 4 wherein:
(a) said yoke positioning mechanism includes a piston and cylinder arrangement and an extension mounted on said yoke;
  (i) said piston and cylinder arrangement being mounted in said assembly to engage said extension; and
  (ii) said piston and cylinder arrangement and said extension being oriented for selected pivoting of said yoke about said pivot axle upon actuation of said piston and cylinder arrangement.

7. An assembly according to claim 6 including:
(a) switch and sensor means associated with said yoke positioning mechanism for sensing when said yoke has been positioned in said engaged position and switching said yoke positioning mechanism to retain said yoke in said engaged position.

8. A transport assembly for use with an unpowered storage conveyor having an associated storage conveyor member movable to convey articles thereon, said transport assembly comprising:
(a) truck means movable to position said transport assembly at a selected storage conveyor;
(b) a transport mechanism mounted on said truck means and including a transport member operable to move an article on said transport assembly to transfer articles between said transport assembly and a selected storage conveyor;
(c) storage conveyor drive means positioned on said transport mechanism and operable to drive a storage conveyor member of a storage conveyor at which said transport assembly is positioned to cause the movement of articles on said storage conveyor; and
(d) storage conveyor grasping means mounted on said transport mechanism and operable to grasp a storage conveyor at which said transport assembly is positioned to cause a positive driving engagement between said storage conveyor drive means and an associated storage conveyor member to drive said storage conveyor member.

9. An assembly as set forth in claim 8 wherein:
(a) said storage conveyor includes a storage conveyor gear;
(b) said storage conveyor drive means includes a drive gear; and
(c) said grasping means is operative to cause the meshing of said drive gear with said storage conveyor gear to rotate said storage conveyor gear to thereby drive said storage conveyor member.

10. An assembly as set forth in claim 8 wherein said grasping means includes:
(a) an arm pivotally mounted on said transport mechanism; and
(b) an arm actuator connected between said arm and said transport mechanism and operable to deploy said arm to grasp said storage conveyor and to retract said arm therefrom.

11. An assembly as set forth in claim 10 including:
(a) sensor means connected with said arm actuator and engaged by said arm upon grasping said storage conveyor to thereupon deactivate said arm actuator.

12. An assembly as set forth in claim 8 wherein:
(a) said storage conveyor includes a storage conveyor gear;
(b) said grasping means includes an arm pivotally mounted on said transport mechanism and an arm actuator connected between said arm and said transport mechanism and operable to deploy said arm to grasp said storage conveyor and to retract said arm therefrom;
(c) said storage conveyor drive means includes a drive gear rotatably mounted on said arm and positioned in meshing engagement with said storage conveyor gear upon the deloyment of said arm; and
(d) a motor is drivingly engaged with said drive gear to rotate said drive gear.

13. An assembly as set forth in claim 12 wherein:
(a) said storage conveyor gear is mounted on a conveyor gear axle; and
(b) said arm includes a notch which is engaged with said conveyor gear axle upon the deployment of said arm to thereby grasp said storage conveyor and cause the meshing of said drive gear with said storage conveyor gear.

14. An assembly as set forth in claim 12 wherein:
(a) said motor is mounted on said transport mechanism and includes a motor shaft;
(b) said arm is pivotally mounted on said motor shaft to move pivotally relative to said motor shaft; and
(c) an intermediate gear is affixed to said motor shaft and is meshed with said drive gear to transfer rotation from said motor to said drive gear.

15. An assembly as set forth in claim 12 wherein:
(a) said arm and said drive gear are mounted on a conveyor drive platform; and
(b) said platform is resiliently connected to said transport mechanism to facilitate the meshing of said drive gear with said storage conveyor gear.

16. In combination:
(a) an unpowered storage conveyor including an asslociated storage conveyor member movable to convey articles on said storage conveyor and a storage conveyor gear drivingly engaged with said storage conveyor member to move said storage conveyor member;
(b) a transport assembly including truck means movable to position said transport assembly at said storage conveyor;
(c) a transport mechanism mounted on said truck means and including a transport member operable to move articles on said transport mechanism to transfer articles between said tranport mechanism and said storage conveyor;

(d) an arm pivotally mounted on said transport mechanism;

(e) a drive gear rotatably mounted on said arm;

(f) a motor drivingly engaged with said drive gear to rotate said drive gear; and (g) an arm actuator connected between said arm and said transport mechanism and operable to deploy said arm to grasp said storage conveyor and mesh said drive gear with said storage conveyor gear to drive said storage cnveyor member and operable to retract said arm to disengage said drive gear from said storage conveyor gear.

17. A combination as set forth in claim 16 wherein:
(a) said storage conveyor gear is mounted on a conveyor gear axle; and
(b) said arm includes a notch which is engated with said conveyor gear axle upon the deployment of said arm to thereby grasp said storage conveyor and cause the meshing of said drive gear with said storage conveyor gear.

18. A combination as set forth in claim 16 wherein:
(a) said motor is mounted on said transport mechanism and includes a motor shaft;
(b) said arm is pivotally mounted on said motor shaft to move pivotally relative to said motor shaft; and
(c) an intermediate gear is affixed to said motor shaft and is meshed with said drive gear to transfer rotation from said motor to said drive gear.

19. A combination as set forth in claim 16 wherein:
(a) said arm and said drive gear are mounted on a conveyor drive platform; and
(b) said platform is resiliently connected to said transport mechanism to facilitate the meshing of said drive gear with said storage conveyor gear.

20. A combination as set forth in claim 16 wherein:
(a) said drive gear rotates in a first angular direction; and
(b) said arm is pivoted into grasping relation with said storage conveyor in a second angular direction opposite from said first angular direction such that the reaction of said arm to the rotation of said drive gear meshed with said storage conveyor gear tends to urge said arm in said second angular direction to maintain grasping engagement between said arm and said storage conveyor and thereby maintain meshing engagement between said drive gear and said storage conveyor gear.

* * * * *